US007086042B2

(12) United States Patent
Abe et al.

(10) Patent No.: US 7,086,042 B2
(45) Date of Patent: Aug. 1, 2006

(54) GENERATING AND UTILIZING ROBUST XPATH EXPRESSIONS

(75) Inventors: Mari Abe, Kanagawa (JP); Scott D. DeWitt, Cary, NC (US); Masahiro Hori, Kanagawa-ken (JP); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 10/127,973

(22) Filed: Apr. 23, 2002

(65) Prior Publication Data

US 2003/0200502 A1 Oct. 23, 2003

(51) Int. Cl.
*G06F 9/45* (2006.01)
(52) U.S. Cl. .................................. 717/143
(58) Field of Classification Search ........... 717/143
See application file for complete search history.

(56) References Cited

U.S. PATENT DOCUMENTS

| 6,785,673 | B1 * | 8/2004 | Fernandez et al. ............ 707/3 |
| 2002/0054090 | A1 * | 5/2002 | Silva et al. .................. 345/747 |
| 2002/0099687 | A1 * | 7/2002 | Krishnaprasad et al. ....... 707/1 |
| 2002/0143816 | A1 * | 10/2002 | Geiger et al. ............... 707/513 |

OTHER PUBLICATIONS

Hori et al., Robustness of External Annotation of Web-Page Clipping . . . , 2000, ACM, p. 1-8.*

J. Clark and S. DeRose, *XML Path Language (Xpath) Version 1.0, W3C Recommendation*, <http://www.w3.org/TR/xpath>, Nov. 16, 1999.

*XML Authoring Tool: FREEDOM, IBM Corporation Research*, <http://www.trl.ibm.com/projects/freedom/index_e.htm>, (Jan. 4, 2002).

M. Hori, G. Kondoh, K. Ono, S. Hirose and S. Singhal, *Annotation-Based Web Content Transcoding*, Proceedings of the 9th World Wide Web Conference (WWW-9), <http://www9.org/w9cdrom/169/169.html>, (Jan. 4, 2002).

M. Abe and M. Hori, *A Visual Approach to Authoring Xpath Expressions, Extreme Markup Languages 2001*, <http://ares.trl.ibm.com/freedom/doc/extml2001/abe0114.html>, (Jan. 18, 2002).

* cited by examiner

*Primary Examiner*—John Chavis
(74) *Attorney, Agent, or Firm*—Jeanine R. Yarletts, Esq.; Steven M. Greenberg, Esq.; Christopher & Weisberg, P.A.

(57) ABSTRACT

A system and method for generating and processing robust XPath expressions. The system can include two or more differing XPath generators, at least one of the XPath generators producing at least two XPath expressions for a selected node, the produced XPath expressions forming a redundant set of robust XPath expressions configured to identify the selected node. The system further can include an XPath resolution processor, the XPath resolution processor resolving each XPath expression in the redundant set, the resolutions identifying a set of candidate nodes, the XPath resolution processor identifying the selected node from among the set of candidate nodes based upon the XPath expressions resolving to the selected node more than any other node in the set of candidate nodes.

18 Claims, 6 Drawing Sheets

GENERATING AND UTILIZING ROBUST XPATH EXPRESSIONS

BACKGROUND OF THE INVENTION

1. Statement of the Technical Field

The present invention relates to the field of Web content transcoding and more particularly to generating XPATH expressions.

2. Description of the Related Art

End-users increasingly access Web content with devices other than conventional desktop content browsers. Such devices include personal digital assistants, cellular telephones and cable television set top boxes. Yet, as these devices lack the same rendering capabilities as the conventional desktop content browser, it is necessary to adapt the Web content from one format intended for use in one type of device, to a another format suitable for rendering in another device. This content adaptation process has been referred to as "transcoding".

The transcoding process can be facilitated through the use of information about the Web content, referred to hereinafter as "meta-information". Meta-information can be provided with the original Web content and can be used to assist the transcoding process in uniquely identifying portions of the Web content. Notably, meta-information can be created without any modification of the original Web content if the meta information is described separately from the Web content. In this regard, the separate provision of such meta-information often is referred to as "external annotation".

External annotations consist of the meta-information and corresponding references to portions of the original Web content. The meta-information and references typically are described according to the Resource Description Framework (RDF) and the XML Path/Pointer (XPath/XPointer) specification. XPath is a syntax for identifying particular sections of markup, such as an HTML or XML formatted document. Each of the RDF and XPath/XPointer specifications have been standardized by the World Wide Web Consortium, referred to hereafter as the "W3C".

XPath, described in depth in James Clark and Steve DeRose, *XML Path Language (XPath) Version* 1.0, W3C Recommendation (Nov. 16, 1999), arose from an effort to provide a common syntax and semantics for functionality which is shared between Extensible Style Sheet Transformations (XSLT) and XPointer. A primary purpose of XPath is to address parts of an XML document in support of which XPath provides basic facilities for manipulating strings, numbers and boolean values. XPath uses a compact, non-XML syntax to facilitate the use of XPath technology within Universal Resource Indicators (URI) and an XML attribute value. XPath operates on the abstract, logical structure of an XML document, rather than its surface syntax. Thus, XPath is aptly named in view of its URL-like path notion for navigating through the hierarchical structure of an XML document.

Notably, XPath expressions can be difficult to create. The XPath standard syntax requires an understanding of complex concepts, including multiple axes and predicates. As will be recognized by one skilled in the art, the XPath syntax plainly is unusual and non-intuitive. Importantly, though creating simplistic XPath expressions can be problematic, creating robust XPath expressions which remain valid notwithstanding changing portions of referenced markup can be even more so problematic. In particular, conventional XPath creation techniques are not configured to handle changing content relied upon as a reference point in associated markup.

For example, the structure and content of hypertext markup language (HTML) documents are known to change with time as the information contained in the HTML document sometimes can be updated hourly or daily. As the contents and structure of the document changes, however, associated annotations which uniquely identify those changed portions of the HTML document can become invalid. This can be particularly true where specific annotations uniquely identify portions of the changing HTML document by reference to a specific document structure. Hence, conventional annotation methods are ineffective in the face of a dynamically changing document.

SUMMARY OF THE INVENTION

The present invention is a method and system for automatically generating and utilizing robust XPath expressions which remain valid, even when portions of a markup language formatted document change. A system for generating a redundant set of robust XPath expressions which can be processed at run-time to resolve a selected node in transcodable markup can include both a visual authoring tool configured to create annotations to the transcodable markup; and, two or more differing XPath generators coupled to the visual authoring tool. The generators can produce at least two XPath expressions for the selected node, the produced XPath expressions forming the redundant set of robust XPath expressions configured to identify the selected node. Each XPath expression in the redundant set can be resolved at run-time, the resolutions identifying a set of candidate nodes. The selected node can be identified from among the set of candidate nodes based upon the XPath expressions resolving to the selected node more than any other node in the set of candidate nodes.

A method of generating and processing robust XPath expressions can include selecting a node in transcodable markup; generating a redundant set of XPath expressions for the selected node; resolving each XPath expression in the set, the resolutions producing a set of candidate nodes; and, identifying the selected node from among the set of candidate nodes based upon the XPath expressions in the set resolving to the selected node more than any other node in the set of candidate nodes. Importantly, the generating step can include generating individual ones of the XPath expressions in the redundant set according to an XPath expression generation methodology selected from the group consisting of a tag-specific methodology, an anchoring methodology and a cascading filtering methodology.

In regard to the tag-specific methodology, a tag-specific trait can be identified in the selected node. Subsequently, an axis specification can be generated for the selected node, in addition to a node test for the identified tag-specific trait and a predicate expression resolving a value for the identified tag-specific trait. Finally, each of the axis specification, the node test and the predicate can be concatenated, the concatenation forming an XPath expression for the selected node. Importantly, the identified tag-specific trait can be verified for uniqueness before performing the generation and concatenation steps.

In regard to the anchoring methodology, a stable anchor can be identified in the transcodable markup along an axis shared by the selected node. An XPath expression can be generated for the stable anchor and an offset can be computed between the stable anchor and the selected node.

Finally, the XPath expression for the stable anchor can be concatenated with the offset, the concatenation forming an XPath expression for the selected node.

In regard to the cascading filtering methodology, a node set can be computed, the node set including each node in the transcodable markup except for the selected node. Individual filters in an ordered sequence of filters can be sequentially loaded and applied to the node set, each application of a filter producing a modified node set. Finally, if the modified node set contains no nodes once all of the individual filters in the ordered sequence have been applied, each individual filter can be concatenated to produce an XPath expression for the selected node.

Significantly, the methods for generating robust XPath expressions can be coupled with a method for processing the robust XPath expressions in order to provide a comprehensive mechanism for identifying a selected node referred to by the robust XPath expressions. In that regard, a system for generating and processing robust XPath expressions can include a set of XPath generators, each generator producing at least one XPath expression for a selected node, or one XPath generator producing at least two XPath expressions for a selected node, the produced XPath expressions forming a redundant set of robust XPath expressions configured to identify the selected node. The system further can include an XPath resolution processor, the XPath resolution processor resolving each XPath expression in the redundant set, the resolutions identifying a set of candidate nodes, the XPath resolution processor identifying the selected node from among the set of candidate nodes based upon the XPath expressions resolving to the selected node more than any other node in the set of candidate nodes.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system and method for generating and using robust XPath expressions. In accordance with the present invention, multiple XPath expression generation methods can be combined to generate a set of XPath expressions which can redundantly identify a particular node in transcodable markup. The methods can include both tag specific methods and general methods for identifying the node. Once the XPath expressions have been generated, a run-time XPath expression resolution process can select a node most likely referred to by the XPath expressions in the set. In this way, XPath expressions referring to the particular node can remain viable, notwithstanding changes to the transcodable markup.

Figure 1:
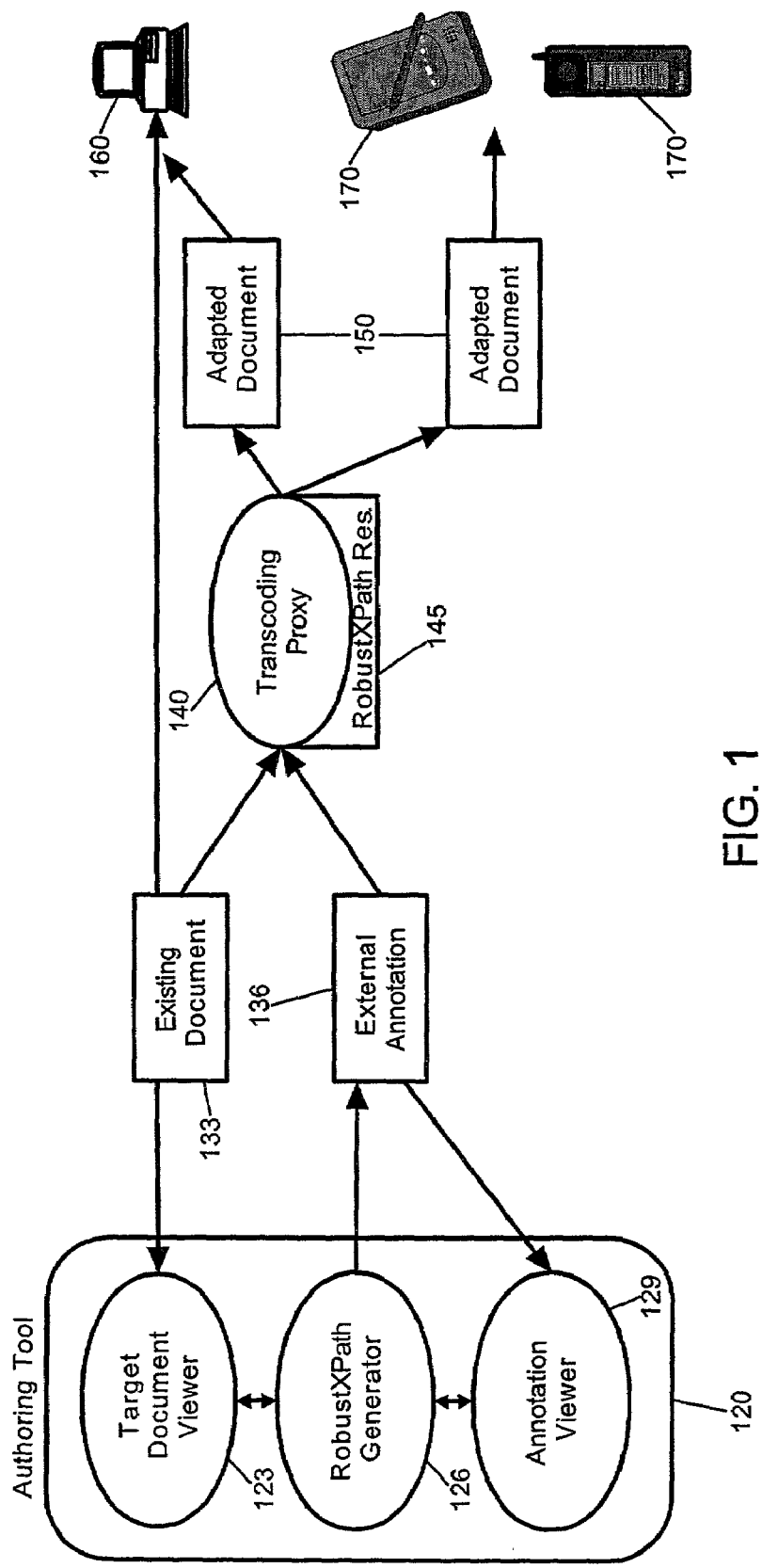
FIG. 1 is a pictorial illustration of a content transcoding system configured to generate and use robust XPath expressions in accordance with the inventive arrangements.

FIG. 1 is a pictorial illustration of a content transcoding system configured to generate and use robust XPath expressions. The system can include an authoring tool 120 which can be used to annotate existing transcodable content 133 configured for presentation in a particular computing platform 160, for instance a personal computer content browser. A transcoding proxy 140 can process the existing document 133, in combination with an external annotation 136 created by the authoring tool 120 to produce an adapted document 150 which can be presented in other computing platforms 170, for instance in a pervasive device microbrowser.

The authoring tool 120 can include a target document viewer 123, an annotation viewer 129 and a robust XPath expression generator 126. The target document viewer 123 can be used to present the markup in an existing document 133. The annotation viewer, by comparison, can be used to present the external annotation 136 produced in reference to the existing document 133. Finally, the robust XPath expression generator 126 can be used to generate a set of XPath expressions for a selected node in the existing document 133 using both tag specific and general XPath expression generation methodologies. A run-time XPath expression resolution process 145 included in association with the transcoding proxy 140 can identify the selected node most likely referred to by the XPath expressions in the generated set during the transcoding process. Importantly, the run-time XPath expression resolution process 145 can identify the node, even where some of the XPath expressions in the set no longer validly refer to the selected node. Hence, the redundancy provided by the set of XPath expressions can result in the valid identification of a selected node notwithstanding changes to the transcodable markup.

Notably, the invention is not limited to the precise instrumentalities illustrated in FIG. 1. In particular, inasmuch as the present invention is a method of generating and utilizing robust XPath expressions, a visual authoring tool is not required. Rather, any tool for authoring external annotations, whether visual or otherwise, can suffice as a platform with which a set of robust XPath expressions can be generated for a selected node. Moreover, while the present invention includes a coupling of both generation-time and run-time methods, any actual method of presenting transcoded content can suffice so long as the run-time methodology suitably identifies the selected node based upon the robust XPath expressions in the set.

Figure 2:
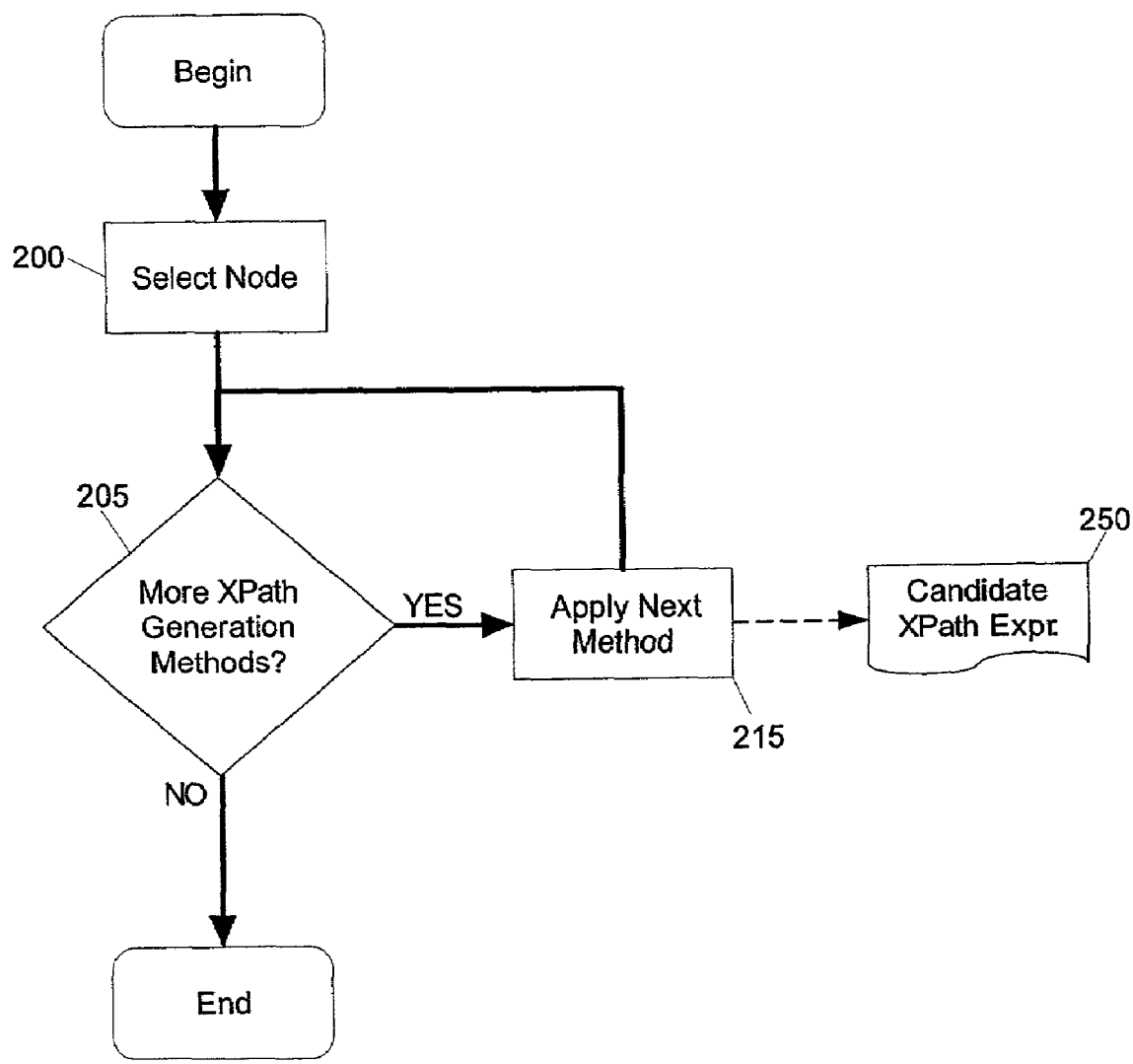
FIG. 2 is a flow chart illustrating a process for generating robust XPath expressions.

FIG. 2 is a flow chart illustrating a process for generating robust XPath expressions in accordance with the inventive arrangements. Beginning in block 200, a node in transcodable content can be selected for which a set of redundant XPath expressions can be generated. The redundant XPath expressions can be generated using a variety of XPath generation methods, for example tag-specific methods, anchoring-based methods, and filtering methods. Hence, in blocks 205 and 215, each configured XPath generation method can be applied in succession in order to generate a redundant set of candidate XPath expressions 250.

Notably, a tag specific XPath expression generation methodology can express the location of a selected node according to traits associated with a markup language tag, for instance the HTML tag, "FORM" or the HTML tag "IMG". By comparison, an anchoring-based XPath generation methodology can express the absolute location of a selected node based upon a location relative to another node. Finally, a filtering technique for locating the selected node in transcodable content can include the successive application of XPaths the combination of which absolutely identify the selected node. In all cases, however, for each methodology applied, a candidate XPath expression 250 can be generated.

Figure 3A:
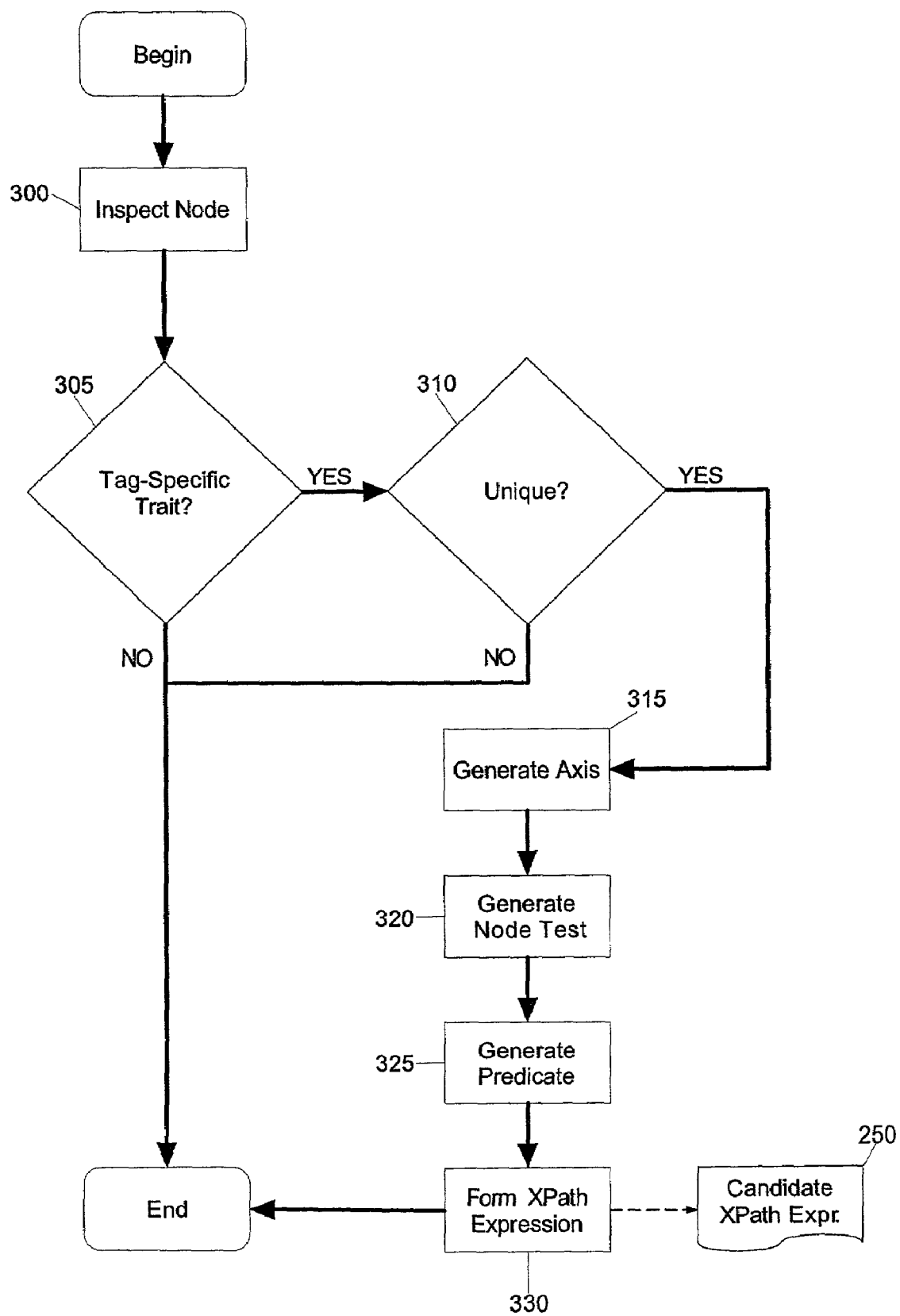
FIGS. 3A through 3C, taken together, are a flow chart illustrating a tag specific, anchoring and filtering process for generating robust XPath expressions; and, FIG. 4 is a flow chart illustrating a run-time process for using the robust XPath expressions generated in FIG. 2.
Figure 3B:
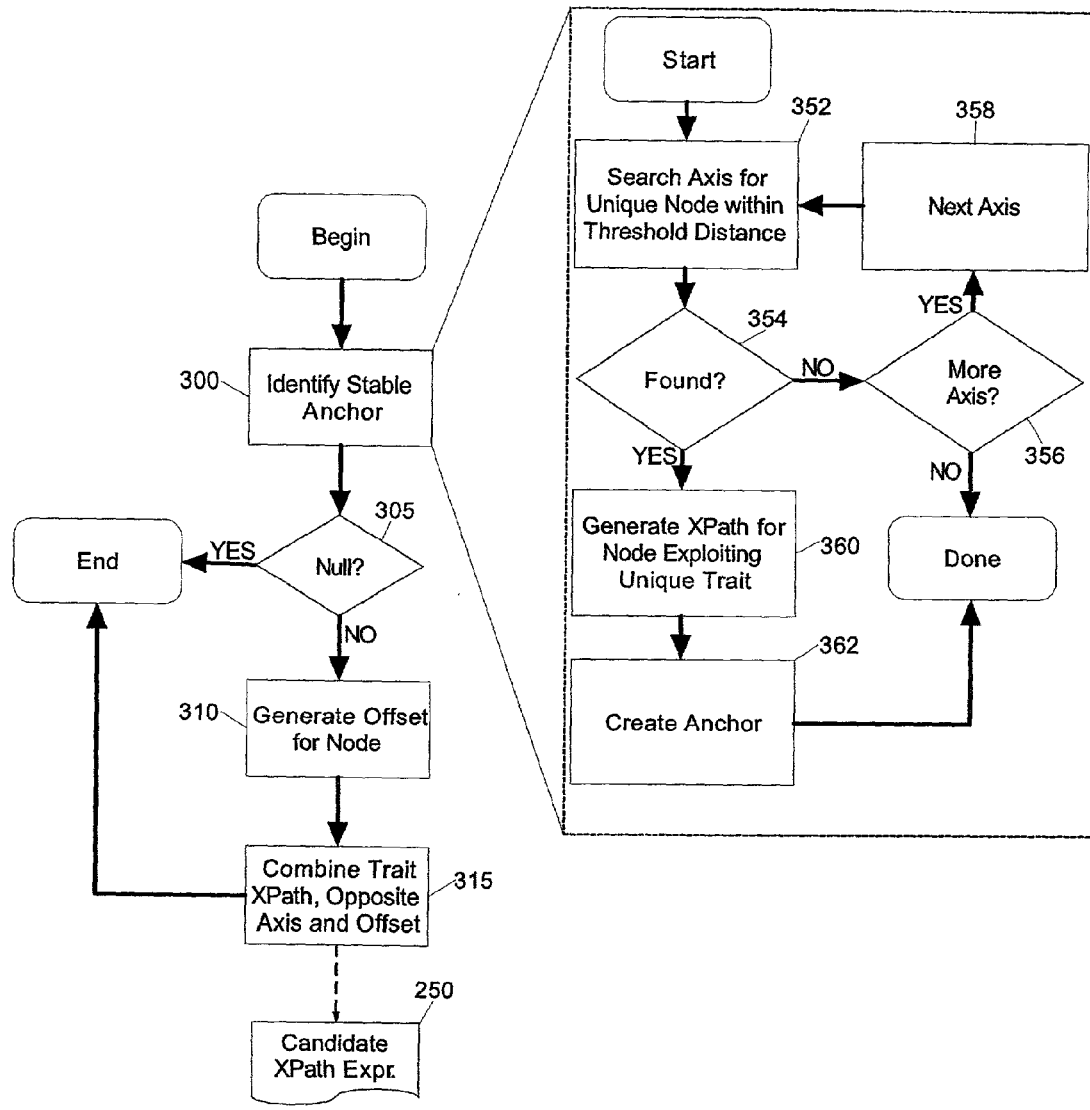
Figure 3C:
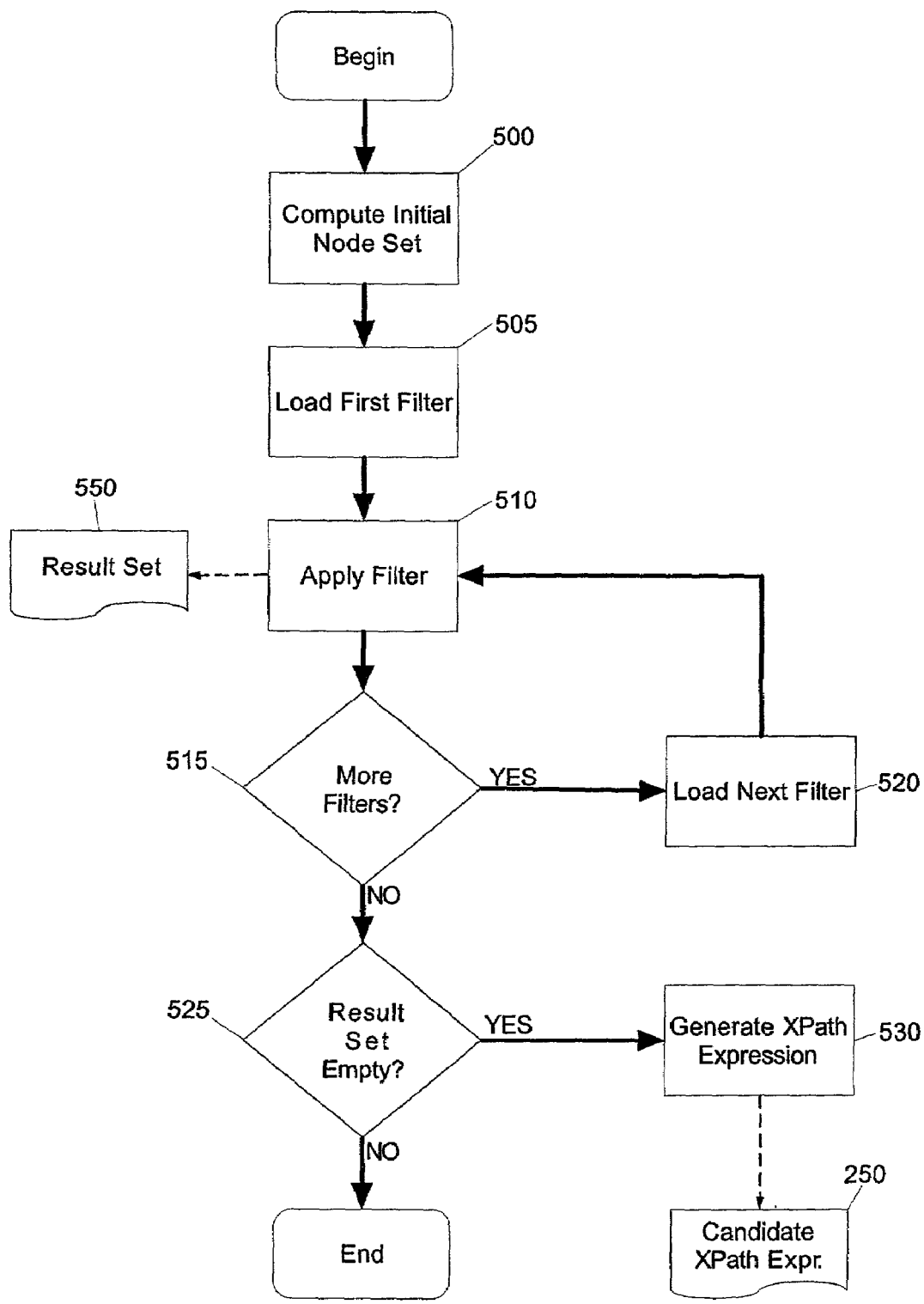

FIGS. 3A through 3C, taken together, illustrate a selection of XPath expression generation methodologies which can be applied in the process of FIG. 2. In particular, FIG. 3A is a flow chart illustrating a tag specific XPath expression generation methodology. Beginning in block 300, the selected node can be inspected for tag-specific traits. For instance, a tag-specific trait can include the ACTION attribute of an HTML FORM tag, a SRC attribute for an HTML IMG tag, or a width attribute of an HTML IMG tag. In fact, the tag-specific trait can be any value that is associated with the tag, such as the existence of a particular attribute associated with the tag, or a specific value of an attribute associated with the tag. As a result, the invention is not limited in regard to the exemplary discussion of HTML and any markup language playing host to elements having tag-specific traits can suffice, including WML, XML, the many SGML variants, and the like.

Returning now to FIG. 3A, in block 305, if the node has a tag-specific trait, in block 310, the uniqueness of the tag-specific trait can be verified. In particular, it can be determined whether the selected tag-specific trait uniquely identifies the selected node and not other nodes in the transcodable content. For example, in the case of an HTML IMG tag the tag-specific source trait of "foo.gif" will more likely resolve to uniqueness rather than the tag-specific width trait of 200, as many image nodes in an HTML document can have a width attribute value of 200, though it is less likely that more than one image node in an HTML document will have the source file attribute of "foo.gif".

If, in decision block 310, the uniqueness of the selected tag-specific trait can be verified, in block 315 an axis specification can be determined. Specifically, an axis specification can indicate a relative direction from one node to another node. Hence, as is well-known in the art, an axis specification can be instrumental in providing a relative addressing of a node in transcodable markup. In that regard, an exemplary axis specification can include: child, descendant, parent, ancestor, preceding-sibling, preceding, following-sibling, and following. Still, the invention is not limited strictly to those axis specifications listed herein, and other axis specifications can be used to indicate the location of the selected node relative to an anchor.

In block 320, a node test can be generated for the selected node. The node test can be useful in producing a qualified name to confirm that the node includes the chosen tag, for instance the HTML "FORM" tag. Specifically, the node test can be a qualified name if the type of the selected node is the principal node type and has an expanded name equivalent to the expanded name specified by the qualified name. Notably, every axis has a principal node type. Moreover, if an axis can contain elements, then the principal node type is element. Otherwise, the principal node is the type of the nodes that the axis can contain.

In block 325 a predicate expression can be generated for the selected node. Importantly, the predicate expression can be constructed to evaluate to a boolean true for a particular tag-specific attribute. For instance, the HTML "FORM" tag can have a specific "action" attribute such as "action='form action'". Hence, the predicate expression can be configured to specify a particular form action. Finally, each of the axis, node test and predicate can be combined in block 330 to produce the candidate XPath expression 250 for the selected node.

FIG. 3B is a flow chart illustrating an anchoring method for producing a candidate XPath expression 250 for a selected node. In the anchoring method, an XPath expression can be generated which specifies the location of the selected node relative to a stable, "anchor" node. Importantly, the anchor can be selected based upon a node in the transcodable markup which would be likely to survive and maintain its positioning within the transcodable markup, notwithstanding changes thereto. The anchor can be considered a "stable anchor" programmatically based upon, for example, where the anchor node contains a unique trait which is likely not to change over time. Examples of such unique traits can include the contents of comment nodes or text nodes, or displayable text headings and footings.

Beginning in block 300, a stable anchor can be identified in the transcodable markup. In particular, in block 352 a first axis of the selected node can be searched for a node having a uniquely identifiable trait. The unique trait can include, for example, a unique substring. Notably, only those nodes along the axis can be searched which are within a threshold number of steps away from the selected node. If, in decision block 354, no nodes are found within the threshold distance of the axis, in block 356 and 358, the next axis can be searched, and the process can repeat until no axes remain to be searched. Though the invention is not so limited, the axes can be searched in the following order: descendant, ancestor, previous-sibling, following-sibling, previous and following.

When a unique node has been located in the subject axis which has the specified unique trait, in block 360 an XPath can be generated for that node based upon the identified trait. For instance, a node type and predicate can be formed and combined into an XPath which uniquely specifies the identified trait. Subsequently, in block 362, an XPath can be generated for the identified anchor according to the trait XPath. If, in the process illustrated in blocks 352 through 358, a stable anchor cannot be identified along any axis, however, a null set can be returned and following decision block 305, the process can end. Otherwise, the anchoring process can continue in blocks 310 through 315.

Specifically, in block 310, an offset can be determined between the stable anchor and the selected node along the computed axis. Specifically, the offset can identify the distance in terms of depth between the selected node and the stable anchor along the computed axis. Many techniques can be applied in computing the offset. For instance, in one aspect of the invention, an axis joining the stable anchor and the selected node can be selected. A location step can be computed for each node in the selected axis, beginning with the node closest to the stable anchor. In particular, a location step can include both a node test identifying the name of the node and a predicate expression, such as an ordinal predicate. Essentially, the node test specifies the type of element in the node, while the predicate expression specifies the distance of the node from the stable anchor.

Notwithstanding, other types of offset generation techniques can suffice. In essence, any method for generating an offset can be applied so long as the offset uniquely identifies the location of the selected node relative to the stable anchor. In particular, it will be apparent that the offset can have a purely structurally defined location, a purely content defined location, or an amalgamation of structural and content constraints used to locate the selected node relative to the stable anchor. In any case, in block 315, the offset can be combined with the axis and the XPath expression of the stable anchor to produce the candidate XPath expression 250 for the selected node.

FIG. 3C is a flow chart which illustrates a cascading filtering process for generating a robust expression for selected node. Specifically, in a cascading filtering process, multiple XPath expressions can exploit traits of a selected node to iteratively refine the node set in order to test the ability of the multiple XPath expressions to uniquely identify the selected node. More particularly, each successive application of a filter can reduce the node set until no nodes remain in the node set. Hence, the combination of all filters can uniquely specify the selected node.

Beginning in block 500, an initial node set can be computed. The initial node set can include the set of all nodes in the transcodable markup excepting for the selected node. In one aspect of the present invention, the node set can be computed merely by requesting of an associated document object model (DOM) a set of all nodes absent the selected node. In blocks 505 and 510, a first filter can be applied to the node set. As is well-known in the art, filters can factor-out nodes which satisfy a specified property or structural uniqueness. In that regard, the filter can be one of a node step filter or a predicate filter. In particular, the node step filter can include an axis specification in combination with a node test. Thus, the node step filter can be one of a node type filter or a structure filter. The predicate filter, by comparison, can include an attribute value filter or an attribute type filter.

In any case, the filter can include an XPath expression fragment combined with an application function. The XPath expression fragment can define a portion of an XPath expression, for example a node test, axis specification, a predicate expression, or any combination thereof. The application function, by comparison, can produce a result set 550 based upon a set of nodes and a context node. Specifically, the result set 550 can be obtained by applying the XPath expression fragment to the set of nodes. The result set 550 produced by each filter application can be used as the input to subsequent filters. More particularly, in blocks 510 through 520, the process can repeat for subsequent chained filters until no filters remain to be applied. In decision block 525, if the result set 525 is empty, leaving only the selected node in the transcodable markup, then in block 530 each XPath expression fragment of each filter in the ordered sequence of filters can be concatenated to produce the candidate XPath expression. In contrast, if the result set is not empty, however, the filtering process will have failed to iteratively produce a refined candidate XPath expression 250.

Figure 4:
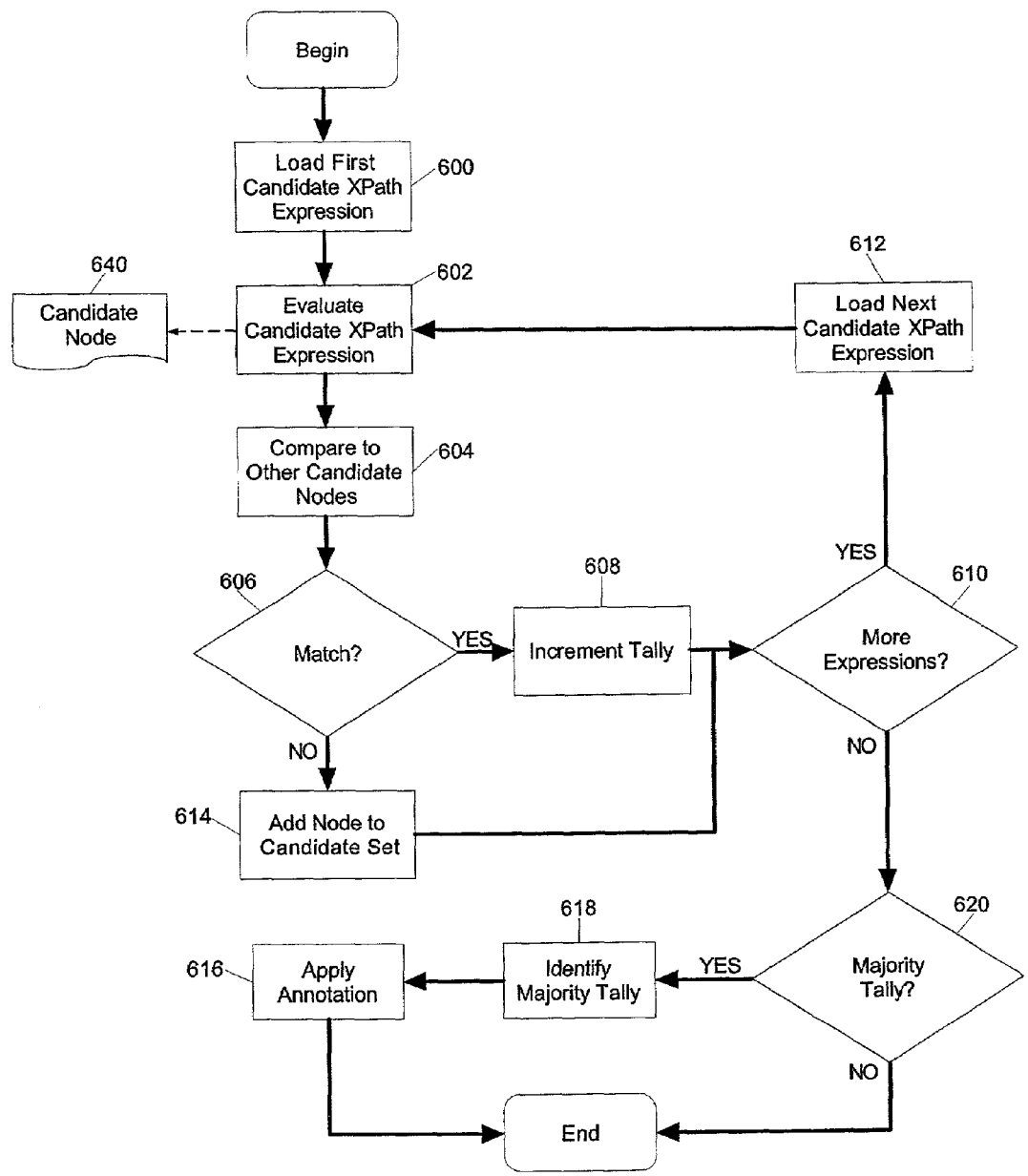

Importantly, in accordance with the inventive arrangements, a run-time XPath expression resolution process can be coupled with the XPath generation process of FIG. 2 to redundantly albeit accurately resolve a suitable XPath expression for a selected node. FIG. 4 is a flow chart illustrating the run-time process for using the robust XPath expressions generated in FIG. 2. Beginning in blocks 600 through 602, each candidate XPath expression 250 can be loaded and evaluated, each evaluation specifying a candidate node 640 in the transcodable markup. Notably, where the expression evaluates to a node set containing more than one node, in one aspect of the invention, the expression can be ignored and the tallies left unchanged. In block 604, the candidate node 640 can be compared to previously evaluated candidate nodes.

In block 606, if a match is detected, in block 608 a tally associated with the candidate node 640 can be incremented, indicating that multiple candidate XPath expressions resolve to the same candidate node. Otherwise, if a match is not detected in block 606, in block 614 the candidate node 614 can be added to the set of previously evaluated candidate nodes. In both cases, in block 610 if additional candidate XPath expressions 250 remain to be evaluated, the next candidate XPath expression 250 can be loaded in block 612 and the process can repeat in blocks 602 through 614.

In block 610, when no more candidate XPath expressions remain to be evaluated, in block 620, it can be determined from the tallies whether any particular candidate node has been specified by a notable number of XPath expressions, for instance by a plurality or majority of all of the XPath expressions. If so, in block 618 the predominately specified candidate node can be identified and an associated annotation can be applied to the predominately specified candidate node in block 616. Otherwise, it can be assumed that the XPath expression is inherently unstable and the annotation can be skipped.

Importantly, by redundantly applying candidate XPath expressions to resolve the identity of a context node, transcoding accuracy can be markedly improved. Consequently, the XPath expression developer can be relieved of the burden of meticulously examining the content of transcodable markup to determine those unique characteristics that can be used to robustly identify nodes in the transcodable markup. Furthermore, robust XPath expressions can be authored with confidence regardless of the likelihood that the content of the transcodable markup will change over time.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for generating and processing robust XPath expressions comprising:
    a plurality of differing XPath generators, at least one of said XPath generators producing at least two XPath expressions for a selected node, said produced XPath expressions forming a redundant set of robust XPath expressions configured to identify said selected node; and,
    an XPath resolution processor, said XPath resolution processor resolving each XPath expression in said redundant set, said resolutions identifying a set of candidate nodes, said XPath resolution processor identifying said selected node from among said set of candidate nodes based upon said XPath expressions resolving to said selected node more than any other node in said set of candidate nodes.

2. The system of claim 1, wherein each said differing XPath generator produces said at least one XPath expression for a selected node based upon an XPath generation methodology, selected from the group consisting of a tag-specific methodology, an anchoring methodology and a cascading filtering methodology.

3. The system of claim 1, wherein said plurality of differing XPath generators are incorporated in a visual authoring tool configured to create annotations to transcodable markup.

4. The system of claim 1, wherein said XPath resolution processor is coupled to a transcoding proxy configured to transcode transcodable markup based upon annotations comprising said redundant set of robust XPath expressionS.

5. A method of generating robust XPath expressions comprising the steps of: electing a node in transcodable markup; and, generating a redundant set of XPath expressions for said selected node.

6. The method of claim 5, wherein said generating step comprises the steps of generating individual ones of said XPath expressions in said redundant set according to an XPath expression generation methodology selected from the group consisting of a tag-specific methodology, an anchoring methodology and a cascading filtering methodology.

7. The method of claim 6, wherein said step of generating individual ones of said XPath expressions in said redundant set according to said tag-specific methodology comprises the steps of:
identifying a tag-specific trait in said selected node; and,
generating an axis specification for said selected node, a node test for said identified tag-specific trait and a predicate expression resolving a value for said identified tag-specific trait; and,
concatenating each of said axis specification, said node test and said predicate, said concatenation forming an XPath expression for said selected node.

8. The method of claim 7, wherein said step of generating individual ones of said XPath expressions in said redundant set according to said tag-specific methodology further comprises the steps of:
verifying the uniqueness of said identified tag-specific trait in said selected node; and,
performing said generating and concatenating steps only if said tag-specific trait uniquely identifies said selected node.

9. The method of claim 7, wherein said step of generating individual ones of said XPath expressions in said redundant set according to said anchoring methodology comprises the steps of:
identifying a stable anchor in said transcodable markup along an axis shared by said selected node;
generating an XPath expression for said stable anchor;
computing an offset between said stable anchor and said selected node; and,
concatenating said offset and said XPath expression for said stable anchor and said offset, said concatenation forming an XPath expression for said selected node.

10. The method of claim 7, wherein said step of generating individual ones of said XPath expressions in said redundant set according to said cascading filtering methodology comprises the steps of:
computing a node set comprising each node in said transcodable markup except for said selected node;
sequentially loading and applying individual filters in an ordered sequence of filters to said node set, each said application of a filter producing a modified node set; and,
if said modified node set contains no nodes once all of said individual filters in said ordered sequence have been applied, concatenating each said individual filter to produce an XPath expression for said selected node.

11. A machine readable storage having stored thereon a computer program for generating and processing robust XPath expressions, said computer program comprising a routine set of instructions for causing the machine to perform the steps of:
selecting a node in transcodable markup; and,
generating a redundant set of XPath expressions for said selected node.

12. The machine readable storage of claim 11, wherein said generating step comprises the steps of generating individual ones of said XPath expressions in said redundant set according to an XPath expression generation methodology selected from the group consisting of a tag-specific methodology, an anchoring methodology and a cascading filtering methodology.

13. The machine readable storage of claim 12, wherein said step of generating individual ones of said XPath expressions in said redundant set according to said tag-specific methodology comprises the steps of:
identifying a tag-specific trait in said selected node; and,
generating an axis specification for said selected node, a node test for said identified tag-specific trait and a predicate expression resolving a value for said identified tag-specific trait; and,
concatenating each of said axis specification, said node test and said predicate, said concatenation forming an XPath expression for said selected node.

14. The machine readable storage of claim 13, wherein said step of generating individual ones of said XPath expressions in said redundant set according to said tag-specific methodology further comprises the steps of:
verifying the uniqueness of said identified tag-specific trait in said selected node; and,
performing said generating and concatenating steps only if said tag-specific trait uniquely identifies said selected node.

15. The machine readable storage of claim 13, wherein said step of generating individual ones of said XPath expressions in said redundant set according to said anchoring methodology comprises the steps of:
identifying a stable anchor in said transcodable markup along an axis shared by said selected node;
generating an XPath expression for said stable anchor;
computing an offset between said stable anchor and said selected node;
identifying an axis opposite to said shared axis; and,
concatenating said opposite axis, said XPath expression for said stable anchor and said offset, said concatenation forming an XPath expression for said selected node.

16. The machine readable storage of claim 13, wherein said step of generating individual ones of said XPath expressions in said redundant set according to said cascading filtering methodology comprises the steps of:
computing a node set comprising each node in said transcodable markup except for said selected node;

sequentially loading and applying individual filters in an ordered sequence of filters to said node set, each said application of a filter producing a modified node set; and, if said modified node set contains no nodes once all of said individual filters in said ordered sequence have been applied, concatenating each said individual filter to produce an XPath expression for said selected node.

17. A system for generating a redundant set of robust XPath expressions which can be processed at run-time to resolve a selected node in transcodable markup comprising:

a visual authoring tool configured to create annotations to the transcodable markup; and, a plurality of differing XPath generators coupled to said visual authoring tool, at least one of said generators producing at least two XPath expressions for the selected node, said produced XPath expressions forming the redundant set of robust XPath expressions configured to identify the selected node, each said XPath expression in said redundant set being resolvable at run-time, said resolutions identifying a set of candidate nodes, the selected node being identifiable from among said set of candidate nodes based upon said XPath expressions resolving to the selected node more than any other node in said set of candidate nodes.

18. The system of claim 17, wherein each said differing XPath generator produces said at least one XPath expression for the selected node based upon an XPath generation methodology selected from the group consisting of a tag-specific methodology, an anchoring methodology and a cascading filtering methodology.

* * * * *